United States Patent [19]

Stensland

[11] Patent Number: 4,988,179
[45] Date of Patent: * Jan. 29, 1991

[54] ELECTROMAGNETICALLY LOCKING MIRROR GLASS ADJUSTING SYSTEM

[75] Inventor: David A. Stensland, Monroeville, Ind.

[73] Assignee: Navistar International Transportation Corp., Chicago, Ill.

[*] Notice: The portion of the term of this patent subsequent to Sep. 18, 2007 has been disclaimed.

[21] Appl. No.: 342,502

[22] Filed: Apr. 19, 1989

[51] Int. Cl.[5] ................................. G02B 7/18
[52] U.S. Cl. ..................... 350/637; 350/632
[58] Field of Search ................... 350/630–636, 350/637, 279, DIG. 3; 340/542, 825.31; 355/28, 75; 248/559–561, 466, 467, 474, 354.3, 354.4, 481, 483; 403/122, 128

[56] References Cited

U.S. PATENT DOCUMENTS

| | | | |
|---|---|---|---|
| 3,434,688 | 3/1969 | Englemann | 248/483 |
| 3,519,335 | 10/1966 | Russell | 350/637 |
| 4,094,591 | 6/1978 | Lafont | 350/636 |
| 4,151,757 | 5/1979 | Pitray | 74/501 M |
| 4,171,875 | 10/1979 | Taylor et al. | 350/637 |
| 4,705,368 | 11/1987 | Manzoni | 248/466 |
| 4,957,359 | 9/1990 | Kruse et al. | 350/637 |

FOREIGN PATENT DOCUMENTS

| | | | |
|---|---|---|---|
| 0494386 | 9/1950 | Belgium | 248/483 |
| 0022244 | 2/1977 | Japan | 350/637 |
| 0179349 | 9/1985 | Japan | 350/637 |

*Primary Examiner*—Bruce Y. Arnold
*Assistant Examiner*—Thong Nguyen
*Attorney, Agent, or Firm*—F. David AuBuchon; Dennis K. Sullivan

[57] ABSTRACT

A side view mirror adjusting system for vehicles of the type having inner and outer semispherical segments nested one within the other for restricted movement one relative to each other is provided with an electromagnet secured to the mounting bracket and operably coupled to the outer segment, an electrical power source coupled to the electromagnet, and an electrical switch arranged between the power source and the electromagnet operable to energize and deenergize the electromagnet for controlling the relative movement of the inner and outer semispherical segments so that the semispherical segments are locked against relative movement upon the energization of the electromagnet.

12 Claims, 3 Drawing Sheets

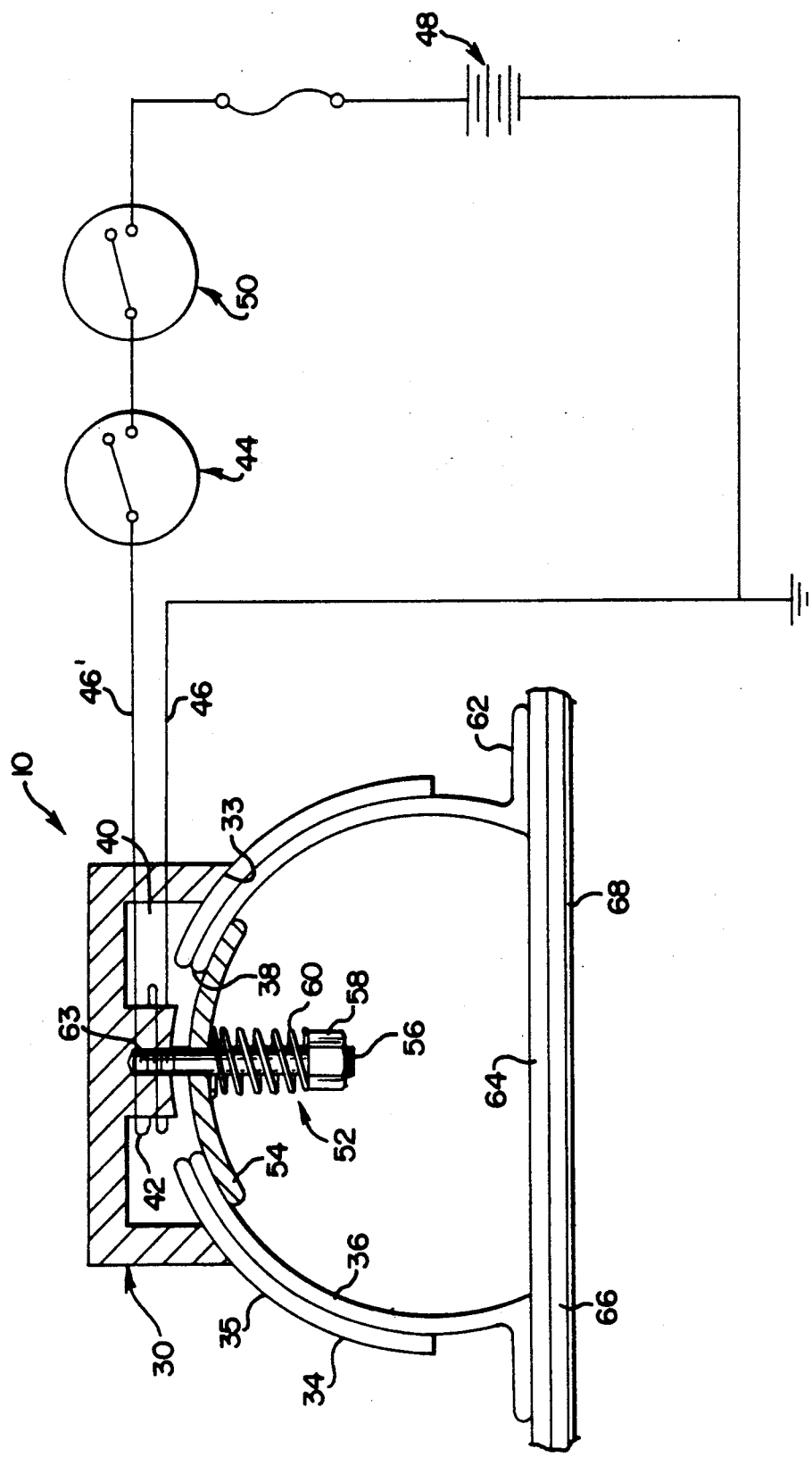

ELECTROMAGNETICALLY LOCKING MIRROR GLASS ADJUSTING SYSTEM

CROSS-REFERENCE TO RELATED APPLICATION

This application is related to U.S. Pat. application Ser. No.D-4480 filed by James W. Kruse and Donald E. Riley on the date hereof and assigned to the assignee hereof, now U.S. Pat. No. 3,957,359.

BACKGROUND OF THE INVENTION

This invention relates generally to adjustable side view mirrors for vehicles and, more particularly, provides a side view mirror adjusting system having means for electromagnetically locking the mirror glass so that the mirror glass is maintained at the adjusted condition not withstanding vehicular vibrations and/or ambient conditions.

Conventionally, side view mirror assemblies for vehicles include a housing, a mirror frame mounting structure secured within said housing, a mirror glass and a mirror glass adjusting mechanism secured to said mirror frame mounting structure and the mirror glass for selectively adjusting the orientation of the mirror glass and includes a pair of supporting members nested one within the other, the outer one of said supporting members being fixedly secured to the mounting frame and the inner supporting member being frictionally coupled to said outer supporting member and resiliently biased clamping means arranged to effect the frictional coupling and mirror means, including a mirror glass secured to said inner supporting member, said clamping means being capable of exerting sufficient force to maintain the orientation of said mirror glass against unintentional change from a set condition yet capable of being relaxed selectively to permit adjustment or resetting of such orientation.

One type of mounting arrangement comprises a pair of nested shells, the outer shell being fixed and secured to the frame or the like within a housing capable of being mounted to the vehicle body. The mirror glass is seated within a mirror bed seated within the inner shell so that the mirror has its reflective surface facing outwardly. Spring biased clamp means are provided to maintain the shells in fixed assembly yet are sufficiently resilient to permit movement of the inner shell relative to the outer shell and hence permit adjustment of the orientation of the mirror glass.

Characteristically, the clamp means may loosen with resultant displacement of the mirror glass from its desired or adjusted orientation. In normal use, vibrations from engine operation, wind, road surface conditions, etc. may fully or partially overcome the spring bias sufficiently to permit vibration of the inner shell and hence complementary vibration of the mirror bed with the mirror glass seated therein, resulting in blurring or like distortion of the mirror image, misorientation of the mirror bed, or involuntary adjustments of the mirror bed from a set orientation. Attempts to overcome these effects by increasing the friction between the sliding surfaces of the shells and minimizing the backlash between the mechanical elements of the assembly may reduce the effect of the vibratory motion but have the undesired result of increasing the torque load required to be overcome in making the desired positional adjustments. In instances where remotely directed manipulation of the mirror bed is provided, as by electric motors arranged to cause positional adjustments, the increased torque load results in material reduction in the durability thereof. Efforts to reduce these forces, while maintaining sufficient force to hold the mirror bed and mirror in an adjusted condition after adjustment has been made, have been less than satisfactory.

SUMMARY OF THE INVENTION

The invention provides a side view mirror adjusting system, particularly for vehicles, comprising inner and outer semispherical segments nested one within the other, opening rearwardly and having coaxial central passageways, the segments capable of movement one relative to the other, a mounting bracket, an electromagnet secured to the mounting bracket and operably coupled to the outer segment, an electrical power source coupled to the electromagnet, electrical switch means arranged between the power source and the electromagnet, clamp means arranged to effect frictional engagement between the nested segments and means on the inner semispherical segment for supporting a mirror, the switch means operable to energize and deenergize the electromagnet for controlling the relative movement of the inner and outer semispherical segments so that the semispherical segments are locked against relative movement depending upon the condition of the electromagnet. In one embodiment of the invention, the electromagnet is energized to lock the semispherical segments, deenergization of the electromagnet releasing the segments and permitting the mirror to be adjusted manually. Another embodiment of the invention is employs electric motors for effecting the adjustment of the mirror subsequent to deenergization of the electromagnet. In both instances, the energization of the electromagnet fixes the orientation of the mirror in adjusted condition.

BRIEF DESCRIPTION OF THE DRAWINGS

FIG. 3 is an electrical schematic representation of the adjusting system illustrated in FIG. 1.

DESCRIPTION OF PREFERRED EMBODIMENTS

Briefly, a preferred embodiment of the mirror mounting adjustment system according to the invention comprises an electromagnet, a pair of nested hemispheres, clamping means releasably clamping the hemispheres against relative movement, mirror mounting means secured to the inner hemisphere and a mirror glass having a reflective surface and being mounted thereon with the reflective surface facing outwardly, an electrical power source coupled to the electromagnet and switch means interposed between the power source and the electromagnet, the electromagnet capable of being energized to prevent relative, movement of the hemispherical segments, the mirror and the inner hemisphere attached thereto being capable of manual manipulation when the electromagnet is deenergized to enable adjustment of the orientation of the mirror about its axis. Electrical motor means can be coupled to the outer hemispherical segment to effect adjustment of the axial orientation of the mirror while the electromagnet is deenergized.

Figure 1:
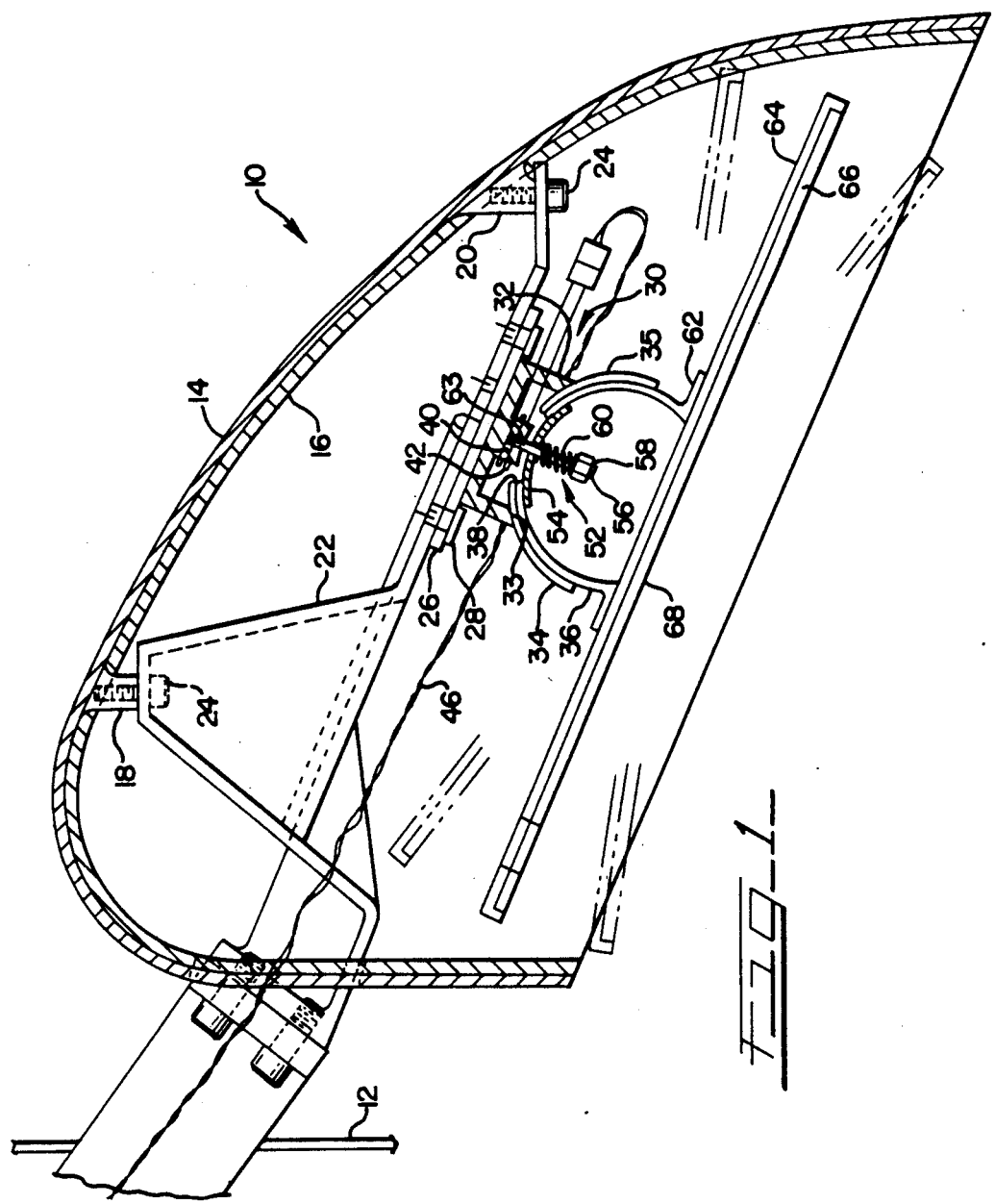
FIG. 1 is a sectional view of a side view mirror assembly having the adjusting system according to the invention operably installed therein.

Referring to FIG. 1, a side view mirror assembly 10 is illustrated secured to a vehicle body 12 and includes a rearwardly opening outer shell 14 and a rearwardly opening inner shell 16 of conforming configuration and having a pair of screw receiving posts 18 and 20. The shells 14 and 16 are nested one within the other, the radii of curvature of the shells being substantially similar. A mounting bracket 22 is secured to the posts 18 and 20 by bolts 24. A mirror mounting support 26 is secured to the mounting bracket 22 by bolts or rivets 28 and includes an electromagnet 30, the outer legs 32 of which having a surface 33 conforming to the outer surface 35 of the outer hemisphere 34 so as to be flush with the outer hemisphere 34 of the pair of nested hemispherical segments, the inner hemisphere 36 of which normally is clamped in frictional engagement nested against the outer hemisphere 34. The hemispherical segments are made of ferromagnetic material or incorporate a strip of ferromagnetic material in their surfaces.

The center leg or core 40 of electromagnet 30 carries an electrical coil winding 42 leading to intermediate switch 44, the leads 46 of which are extended to the vehicle battery 48 via the vehicle ignition system as represented by the ignition switch 50. The switch 44 permits the vehicle ignition switch 50 to be kept on while the electromagnet 30 is deenergized to permit adjustment of the mirror.

The inner and outer hemispheres 36 and 34 have coaxial central openings 38. The inner and outer hemispheres are held nested one within the other in place by a resiliently biased clamp 52. Clamp 52 comprises a spherical bearing member 54, a threaded post 56, a hexagonal nut 58 and a helical spring 60 mounted on the post 56 between the bearing member 54 and the nut 58. The post 56 passes through the openings 38 and is engaged within threaded opening 63 formed in the leg or core 40. The spring 60 has sufficient strength to force the bearing member 54 against the inner hemisphere 36 to effect a frictional engagement with the facing surface of hemisphere 36 but normally permitting some relative movement of the hemispheres 34 and 36. The inner hemisphere 36 has an outwardly extending rim 62. The mirror mounting bed 64 is secured to the rim 62 and a mirror glass 66 is seated therewithin with the reflective surface 68 facing outward.

Figure 2:
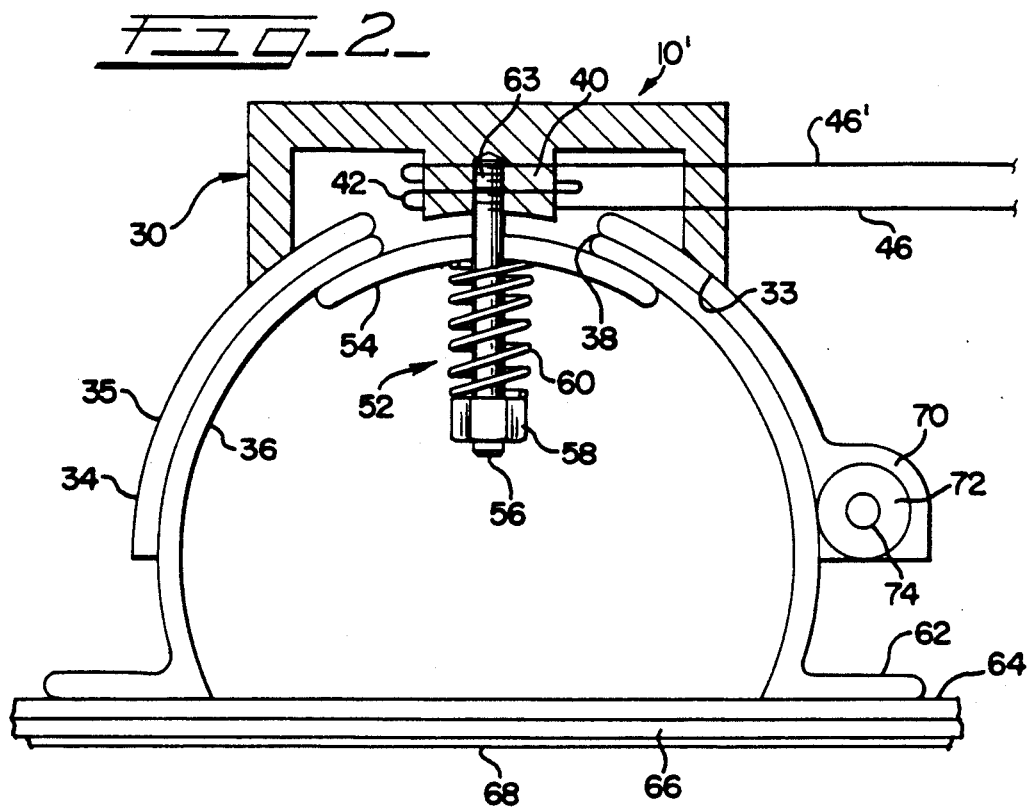
FIG. 2 is an enlarged sectional view of a modified embodiment of the adjusting system according to the invention.

A modified embodiment of the adjusting system of the invention is illustrated in FIG. 2 and is represented by 40 reference character 10'. System 10' is identical to the manually adjustable means employed with the adjustable side mirror 10 of FIG. 1 but for the provision of a support 70 provide on the outer hemisphere 34. Electric motor means such as motors 72 and 74(FIG. 4) are mounted on support 70 to provide motorized adjustment about the two axes of the hemisphere. The mounting bed 64 can be manually adjusted by digital manipulation to provide spherical adjustment, so long as the electromagnet is not energized. Once the electromagnet 30 is energized, the pair of hemispheres are locked in place. When the ignition switch 50 of the vehicle is manipulated to its "turned on" condition and the switch 44 manipulated, the electromagnet 30 is energized and the orientation of the mirror cannot be changed. When the switch 44 is manipulated to its "off" position, the mirror can be adjusted as the normal bias of the spring 60 can be overcome to permit movement of the inner hemisphere relative to the outer hemisphere.

Figure 4:
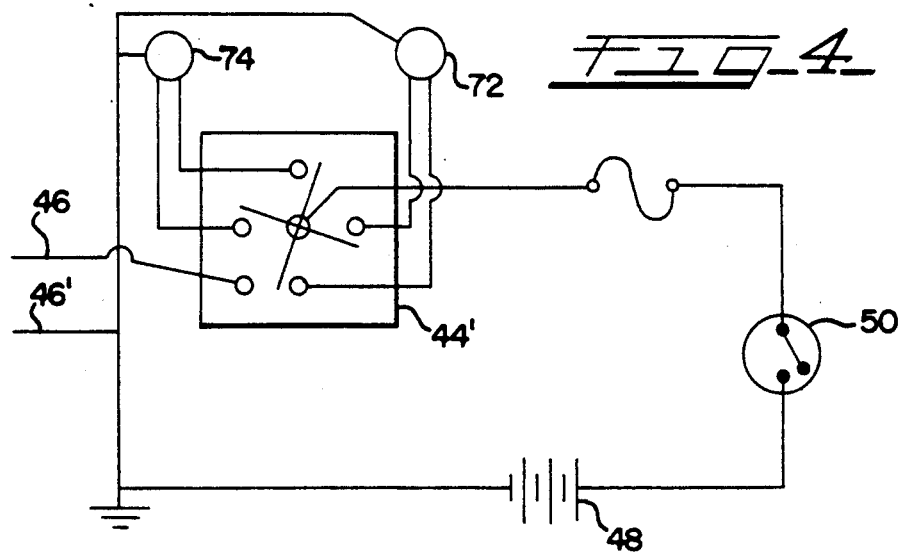
FIG. 4 is an electrical schematic representation showing the modified embodiment of the adjusting system illustrated in FIG. 2.

FIGS. 3 and 4 are electrical schematic representations of the adjusting means of the invention, FIG. 3 illustrating the manually adjustable means while FIG. 4 is an electrical schematic representation of the motorized embodiment of the invention. The motorized embodiment of the invention 10' can incorporate both the manual and the motorized adjustment means described above. Both embodiments of the invention require the operation of the electromagnet in energized condition to lock the mirror in the desired orientation, with deenergization enabling change or adjustment of the orientation of the mirror.

Many alternative structures can be devised and variations made in these structures as well as those illustrated and described herein without departing from the spirit and scope of the invention as set forth in the appended claims.

What I claim is:

1. A mirror glass adjustment system comprising: inner and outer mounting elements arranged in close proximity, at least one of said elements being movable selectively relative to the other; resiliently biased clamping means for releasably coupling said mounting elements one to the other; a mirror glass fixedly mounted to a movable one of said mounting elements; electromagnet means selectively energizable to control the degree of coupling said mounting elements; a source of electrical power; switch means connected between said electromagnet means and said electrical power source operates selectively to place said electromagnetic means in energized and deenergized conditions; and said mirror glass capable of being manipulated to assume a selected orientation upon relative change in the dispositional relationship of said inner and outer elements in one condition of said electromagnet means and fixed at said selected orientation in the other condition of said electromagnetic means.

2. The system as claimed in claim 1 and said electromagnet means being selectively energizable to immobilize said mounting elements one relative to the other.

3. The system as claimed in claim 1 and said switch means comprising a vehicle ignition switch and secondary switch means between aid ignition switch and said electromagnet means, said secondary switch mans being operable to connect and disconnect said ignition switch and aid electromagnet means.

4. The system as claimed in claim 1 in which said inner and outer mounting elements are formed of a ferromagnetic material 5. The system as claimed in claim 1 in which each of said mounting elements include at least one strip of ferromagnetic material.

6. The system as.claimed in claim 1 in which said mounting elements comprise semispherical segments arranged nested one within the other, the inner segment being operatively proximate to said electromagnet means and having a peripheral rim, said mirror glass being secured to said rim.

7. The system as claimed in claim 1 in which said mounting elements comprise semispherical segments arranged nested one within the other, the inner segment being operatively proximate to said electromagnet means, the inner segment having a peripheral rim, a mirror-mounting bed secured to said rim and said mirror glass being secured within said bed with the reflective surface thereof facing outward thereof.

8. The system as claimed in claim 1 and further comprises an electric motor means operably coupled to said power source and said mounting elements for effecting movement of said mirror glass about its axis when said electromagnetic means are deenergized.

9. The adjusting system as claimed in claim 1 and further comprises an electric motor means operably coupled to said power source and to said mounting elements for effecting movement of said mirror glass about both its vertical and horizontal axes when said electromagnetic means are deenergized.

10. The adjusting system as claimed in claim 1 in which said mounting elements comprise a pair of nested hemispheres, the inner hemisphere having an outwardly directed rim, a mirror glass secured to said outwardly directed rim and having a reflective surface facing outwardly of said rim.

11. The adjusting system as claimed in claim 10 and further comprises an electric motor means operably coupled to said power source and to the outer one of said mounting elements whereby to enable movement of said mirror glass about at least one of its axes.

12. The adjusting system as claimed in claim 11 wherein the resilient bias of said clamping means is capable of being manually overcome whereby to enable adjustment of said mirror glass when said electromagnet means are deenergized.

* * * * *